US012792257B2

(12) United States Patent
Kakuda et al.

(10) Patent No.: US 12,792,257 B2
(45) Date of Patent: Nov. 10, 2026

(54) SEMICONDUCTOR DEVICE

(71) Applicant: Renesas Electronics Corporation, Tokyo (JP)

(72) Inventors: Shinichi Kakuda, Tokyo (JP); Yoshinobu Kaneda, Tokyo (JP); Takayuki Nishiyama, Tokyo (JP); Mitsuhiro Ono, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 28 days.

(21) Appl. No.: 18/916,890

(22) Filed: Oct. 16, 2024

(65) Prior Publication Data

US 2025/0123769 A1 Apr. 17, 2025

(30) Foreign Application Priority Data

Oct. 16, 2023 (JP) ................................ 2023-178393

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 11/1044; G06F 11/1441
See application file for complete search history.

(56) References Cited

U.S. PATENT DOCUMENTS

| | | | | |
|---|---|---|---|---|
| 5,802,546 A * | 9/1998 | Chisholm | H04L 49/901 | 711/111 |
| 7,398,554 B1 * | 7/2008 | Falik | G11C 16/22 | 365/185.04 |
| 8,271,720 B1 * | 9/2012 | Hwu | G06F 12/0246 | 711/168 |
| 2007/0070675 A1 * | 3/2007 | Do | G11C 29/025 | 365/63 |

(Continued)

FOREIGN PATENT DOCUMENTS

CN 114518972 A * 5/2022 ............ G06F 11/073

OTHER PUBLICATIONS

Witteman, M. "Secure Application Programming in the presence of Side Channel Attacks", Riscure Embedded Systems Library, retreived online Jul. 5, 2023, 23 pages.

*Primary Examiner* — Sarah Su
*Assistant Examiner* — Abdullah Almamun
(74) *Attorney, Agent, or Firm* — Rimon P.C.

(57) ABSTRACT

A semiconductor device is protected from glitch attacks (FIA). A reset data transfer controller RDTC executes N times of data transfer, transferring data DT stored in a first memory MEM1*a* to a main register REGm during the first data transfer, and transferring data DT stored in the first memory MEM1*a* to a sub-register REGs during the Nth data transfer. A comparison circuit CMP1 determines the match/mismatch between the data DTm transferred to the main register REGm and the data DTs transferred to the sub-register REGs, and outputs a determination result signal RS representing the determination result. A system controller SYSC activates a processor PRC when the determination result signal RS indicates a match, and causes the reset data transfer controller RDTC to execute the N times of data transfer again when it indicates a mismatch.

8 Claims, 9 Drawing Sheets

(56) References Cited

U.S. PATENT DOCUMENTS

| | | | | |
|---|---|---|---|---|
| 2010/0077472 | A1* | 3/2010 | Kaabouch | G06F 21/74 726/16 |
| 2016/0048392 | A1* | 2/2016 | Mitsuishi | G06F 13/24 711/165 |
| 2018/0157841 | A1* | 6/2018 | Shin | G06F 21/44 |
| 2022/0405012 | A1* | 12/2022 | Sreedhar | G06F 3/0613 |
| 2024/0061926 | A1* | 2/2024 | Veshchikov | G06F 21/52 |
| 2024/0184735 | A1* | 6/2024 | Kim | H04L 12/40104 |
| 2024/0211603 | A1* | 6/2024 | Liu | G06F 21/575 |

* cited by examiner

SEMICONDUCTOR DEVICE

CROSS-REFERENCE TO RELATED APPLICATIONS

The disclosure of Japanese Patent Application No. 2023-178393 filed on Oct. 16, 2023, including the specification, drawings and abstract is incorporated herein by reference in its entirety.

BACKGROUND

The present invention relates to a semiconductor device, for example, a semiconductor device equipped with a processor.

There are disclosed techniques listed below.

Non-Patent Document 1

"Secure Application Programming in the presence of Side Channel Attacks", [online], [Accessed on Sep. 26, 2023], Internet <URL: https://riscureprodstorage.blob.core.windows.net/production/2017/08/Riscure_Whitepaper_Side_Channel_Patterns.pdf>

Non-Patent Document 1 in "4.6 FAULT.DOUBLECHECK" discloses a method for implementing countermeasures against glitch attacks (FIA: Fault Injection attack) using software. Specifically, it discloses a method for double-checking the identity of data read at a certain point in time with data read after a fixed period of time, using software when utilizing important data.

SUMMARY

For example, in a semiconductor device equipped with a processor or the like, or in other words, a semiconductor chip, at the time of chip startup, it is possible to perform various initial settings for the entire chip by transferring predetermined data from non-volatile memory to registers. Such transfer operations are also referred to as reset transfers. Among the initial setting items by reset transfer, there may be included the protection state of security. The processor starts up after completing various initial settings by such reset transfer.

On the other hand, as one of the methods of Fault Injection Attacks (FIA), for example, a method of inverting important data representing the protection state of security, etc., is mentioned. If such a glitch attack is carried out during reset transfer, for example, the protection state of security can be changed, allowing unauthorized control of the semiconductor chip, and leading to possible tampering or leakage of important data. As a countermeasure against glitch attacks, a method of performing a double check using software, as shown in Non-Patent Document 1, is known. However, this method can be applied after the processor has started and is in a state where software can be executed, but it is difficult to apply during reset transfer.

The embodiment described later is made in view of such matters, and other problems and novel features will become apparent from the description of this specification and the accompanying drawings.

A semiconductor device according to one embodiment includes a processor formed on a semiconductor chip, a memory controller including a memory unit, a register unit, and a comparison circuit, a reset data transfer controller that executes data transfer from the memory unit to the register unit at the time of chip startup, and a system controller. The memory unit has a first memory in which data necessary for the initial setting of the semiconductor chip is stored. The register unit has a first register referred to during the initial setting of the semiconductor chip, and a second register for verifying the first register. The reset data transfer controller executes data transfer N times, transferring data stored in the first memory to the first register at the first data transfer, and transferring data stored in the first memory to the second register at the Nth data transfer. The comparison circuit determines the match/mismatch between the data transferred to the first register and the data transferred to the second register, and outputs a determination result signal representing the determination result. The system controller, if the determination result signal indicates a match, starts the processor, and if it indicates a mismatch, causes the reset data transfer controller to execute the N times data transfer again.

According to one embodiment, it is possible to protect the semiconductor device from Fault Injection Attacks (FIA).

DETAILED DESCRIPTION

Figure 1:
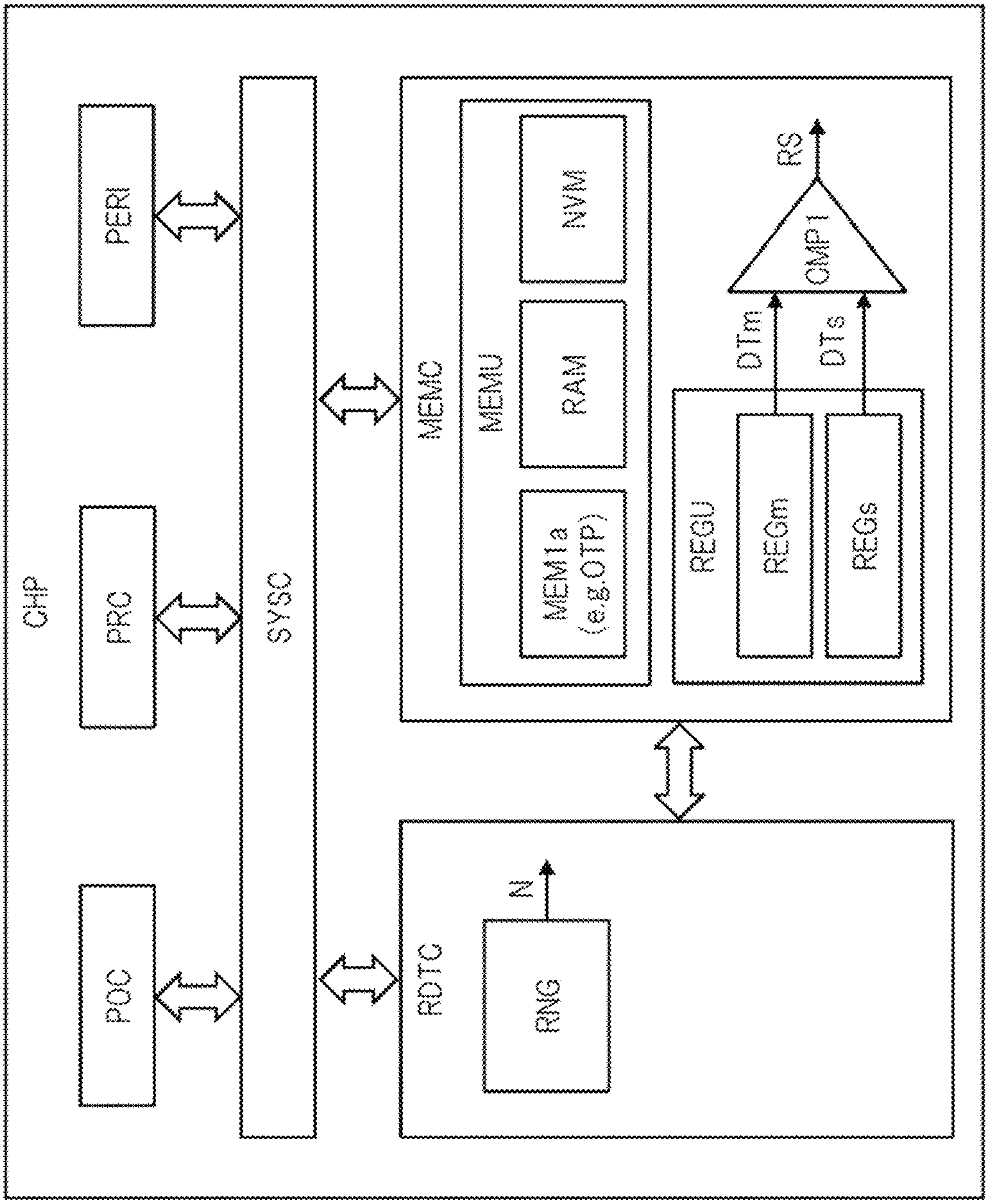
FIG. 1 is a block diagram showing a schematic configuration example of main parts of a semiconductor device according to a first embodiment.

In the following embodiments, for convenience, when necessary, the description may be divided into a plurality of sections or embodiments. Except when specifically stated, these are not unrelated to each other; rather, one may be related to the other as a modification, detail, supplementary explanation, etc., of part or all of it. Also, in the following embodiments, when referring to the number of elements, etc. (including the number of elements, numerical values, quantities, ranges, etc.), unless specifically stated or clearly limited to a specific number in principle, it is not limited to that specific number and may be more or less than that specific number.

Furthermore, in the following embodiments, it goes without saying that the constituent elements (including element steps and the like) are not necessarily essential, except in cases where they are specifically stated or considered to be obviously essential in principle. Similarly, in the following embodiments, when referring to the shapes, positional relationships, etc., of components, unless specifically stated or considered not to be the case in principle, it is assumed to include those that are substantially approximate or similar to those shapes, etc. The same applies to the above numerical values and ranges.

Moreover, the circuit elements constituting each functional block of the embodiments are not particularly limited but are formed on a semiconductor substrate such as single-crystal silicon by known integrated circuit technologies, including CMOS (Complementary Metal-Oxide-Semiconductor).

Hereinafter, embodiments are described in detail with reference to the drawings. In all the drawings for explaining the embodiments, members having the same functions are denoted by the same reference numerals, and repetitive descriptions thereof are omitted. Also, in the following embodiments, descriptions of the same or similar parts will not be repeated in principle except when particularly necessary.

First Embodiment

<Outline of Semiconductor Device>

FIG. 1 is a block diagram showing a schematic configuration example of the main part of a semiconductor device according to the first embodiment. The semiconductor device according to the first embodiment has a semiconductor chip CHP, such as a SoC (System on Chip), on which a plurality of circuits are formed, as shown in FIG. 1. The plurality of circuits include a power-on controller POC, a processor PRC, a reset data transfer controller RDTC, a memory controller MEMC, various peripheral circuits PERI, and a system controller SYSC.

The various peripheral circuits PERI include various circuits required by the semiconductor device, such as communication interface circuits with the outside of the chip, analog-to-digital converters, digital-to-analog converters, etc. The system controller SYSC controls the power-on controller POC, processor PRC, memory controller MEMC, reset data transfer controller RDTC, and various peripheral circuits PERI, thereby controlling, for example, the operation sequence of the entire semiconductor chip CHP.

The power-on controller POC releases the reset state of the entire semiconductor chip CHP in response to power being supplied to the semiconductor chip CHP or in response to a reset signal from an external reset terminal. The processor PRC is, for example, a CPU (Central Processing Unit) and may further include a GPU (Graphics Processing Unit) or a DSP (Digital Signal Processor).

The memory controller MEMC includes a memory unit MEMU, a register unit REGU, and a comparison circuit CMP1. The memory controller MEMC primarily controls access to the memory unit MEMU or the register unit REGU. The memory unit MEMU includes, for example, a first memory MEM1*a*, a volatile memory RAM such as SRAM (Static Random Access Memory), and a non-volatile memory NVM such as MRAM (Magnetoresistive RAM) and flash memory. The register unit REGU includes a main register (first register) REGm and a sub-register (second register) REGs.

In the non-volatile memory NVM, for example, programs are stored. Such programs are copied from the non-volatile memory NVM to the volatile memory RAM. The processor PRC executes the program copied to the volatile memory RAM. The first memory MEM1*a* is composed of non-volatile memory that allows writing only once, in other words, is not rewritable, such as fuse ROM (Read Only Memory), OTP (One Time Programmable)-ROM, etc. The first memory MEM1*a* is pre-stored with data necessary for the initial setting of the semiconductor chip CHP, that is, initial setting data.

The initial setting data includes important data representing the security protection status, etc. As specific examples, the initial setting data may include the setting values of protection bits for commands, the setting values of protection bits for boot firmware, that is, values determining whether protection is enabled or disabled. The reset data transfer controller RDTC executes data transfer, that is, reset transfer from the memory unit MEMU to the register unit REGU at the startup of the semiconductor chip CHP.

As will be described in detail later, the reset data transfer controller RDTC transfers the data stored in the first memory MEM1*a*, that is, the initial setting data, to the main register REGm or the sub-register REGs by data transfer N times, where N is an integer greater than or equal to 2. The reset data transfer controller RDTC includes a random number generation circuit RNG to generate the value of N, the number of these data transfers, by random number.

Herein, the data DTm transferred to the main register REGm is referenced during the initial setting of the semiconductor chip CHP, for example, by a processor PRC or a system controller SYSC, among others. On the other hand, the sub-register REGs is provided for verifying the data DTm of the main register REGm. That is, a comparison circuit CMP1 within the memory controller MEMC determines the match/mismatch between the data DTm transferred to the main register REGm and the data DTs transferred to the sub-register REGs. Then, the comparison circuit CMP1 outputs a determination result signal RS, which represents the result of the determination, to the system controller SYSC.

Figure 2:
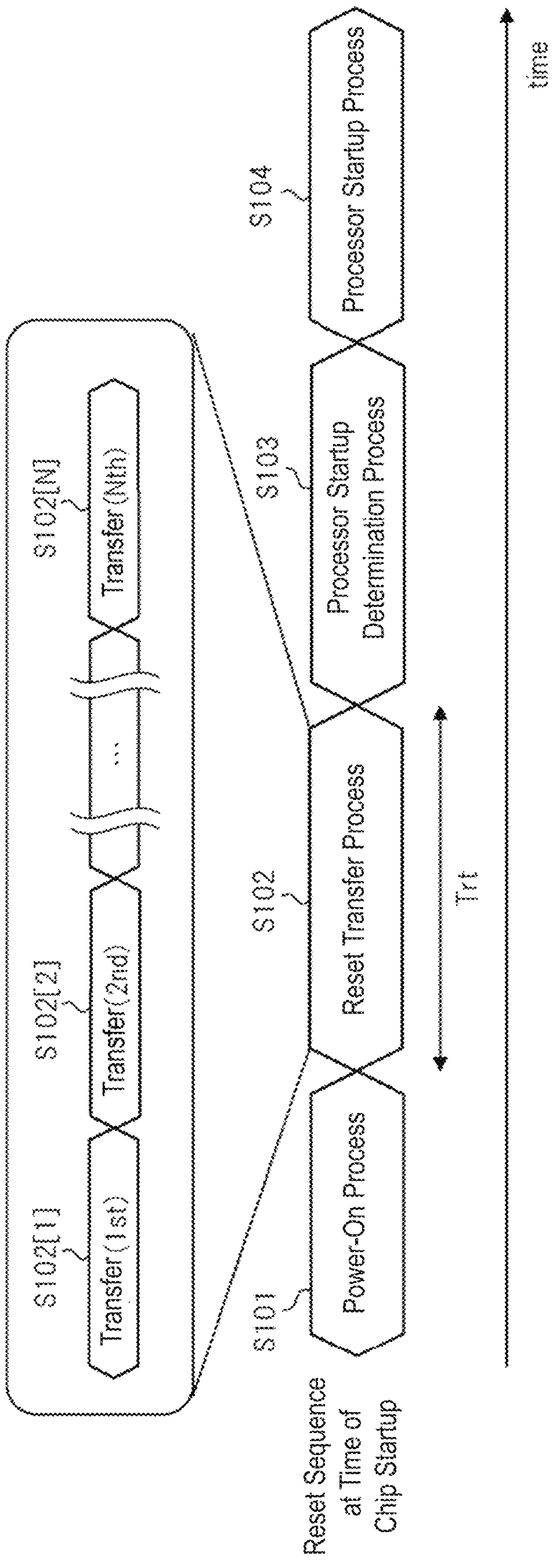
FIG. 2 is a sequence diagram showing an example of schematic operation at chip startup in the semiconductor device shown in FIG. 1.

FIG. 2 is a sequence diagram showing an example of the general operation at the time of chip startup in the semiconductor device shown in FIG. 1. The semiconductor chip CHP executes a reset sequence as shown in FIG. 2 at the time of chip startup. In this reset sequence, the semiconductor chip CHP sequentially executes a power-on process (step S101), a reset transfer process (step S102), a processor startup determination process (step S103), and a processor startup process (step S104).

In the power-on process (step S101), the power-on controller POC releases the reset state of the semiconductor chip CHP. In the reset transfer process (step S102), the reset data transfer controller RDTC performs data transfer from the memory unit MEMU to the register unit REGU, namely, the reset transfer of the initial setting data. In the processor startup determination process (step S103), the system controller SYSC determines whether the reset transfer has been executed correctly. Then, if the reset transfer has been executed correctly, in the processor startup process (step S104), the system controller SYSC starts the processor PRC.

In such a reset sequence, if a glitch attack (FIA) is carried out during the reset transfer, there is a risk that the data DTm in the main register REGm may be destroyed. For example, if the enable signal is attacked, the main register REGm cannot intake the data itself, and as a result, cannot retain the correct data. If the address signal is attacked, the correspondence between the data stored in the first memory MEM1*a* and the data stored in the main register REGm is mistaken, and as a result, the main register REGm cannot retain the correct data. If the data signal is attacked, the main register REGm intakes incorrect data, and as a result, cannot retain the correct data.

Thus, if the data DTm in the main register REGm is destroyed, and for example, the settings of the aforementioned protection bits are changed, it may result in unauthorized control of the semiconductor chip CHP, leading to potential leakage or tampering of software externally. Moreover, particularly, the reset transfer process (step S102) may become vulnerable to glitch attacks from the perspective of the ease of determining the timing of the attack. That is, an attacker can arbitrarily determine the start timing of step S101, for example, using an external reset terminal, and can also relatively easily grasp the start timing of the reset transfer process (step S102) that is executed immediately thereafter.

Therefore, in the method of the first embodiment, as shown in FIG. 2, by executing N times data transfer (steps S102[1]-S102[N]) during the reset transfer process (step S102), the semiconductor chip CHP is protected from glitch attacks. Here, since the value of N is a random number, the duration Trt of the reset transfer process (step S102) varies according to the value of N. It should be noted that the countermeasure method shown in Non-Patent Document 1 is a software-based method and is applicable after the processor startup process (step S104).

<Detailed Operation of Semiconductor Device>

Figure 3A:
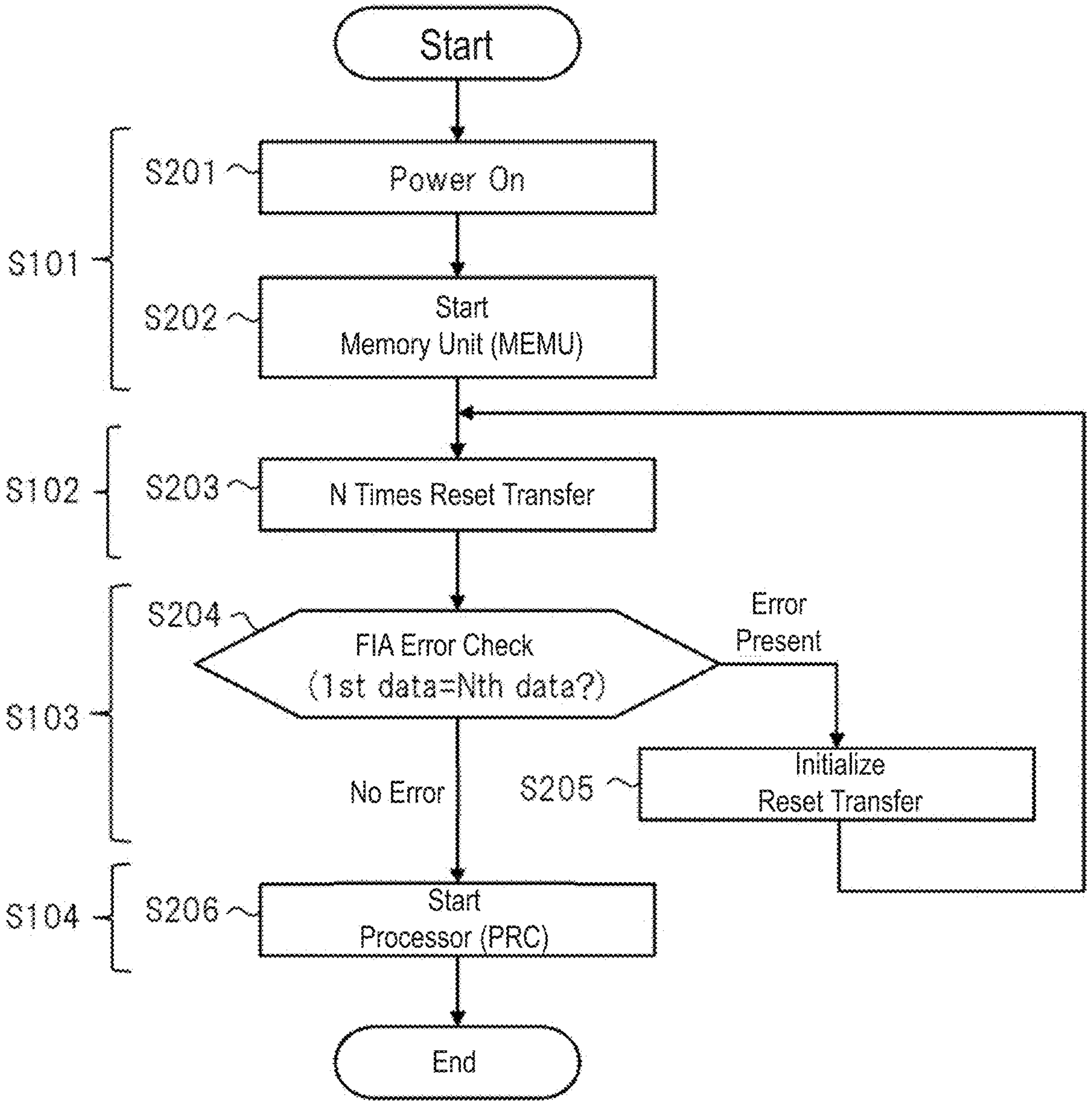
FIG. 3A is a flowchart showing an example of detailed processing content at chip startup in the semiconductor device shown in FIG. 1.
Figure 3B:
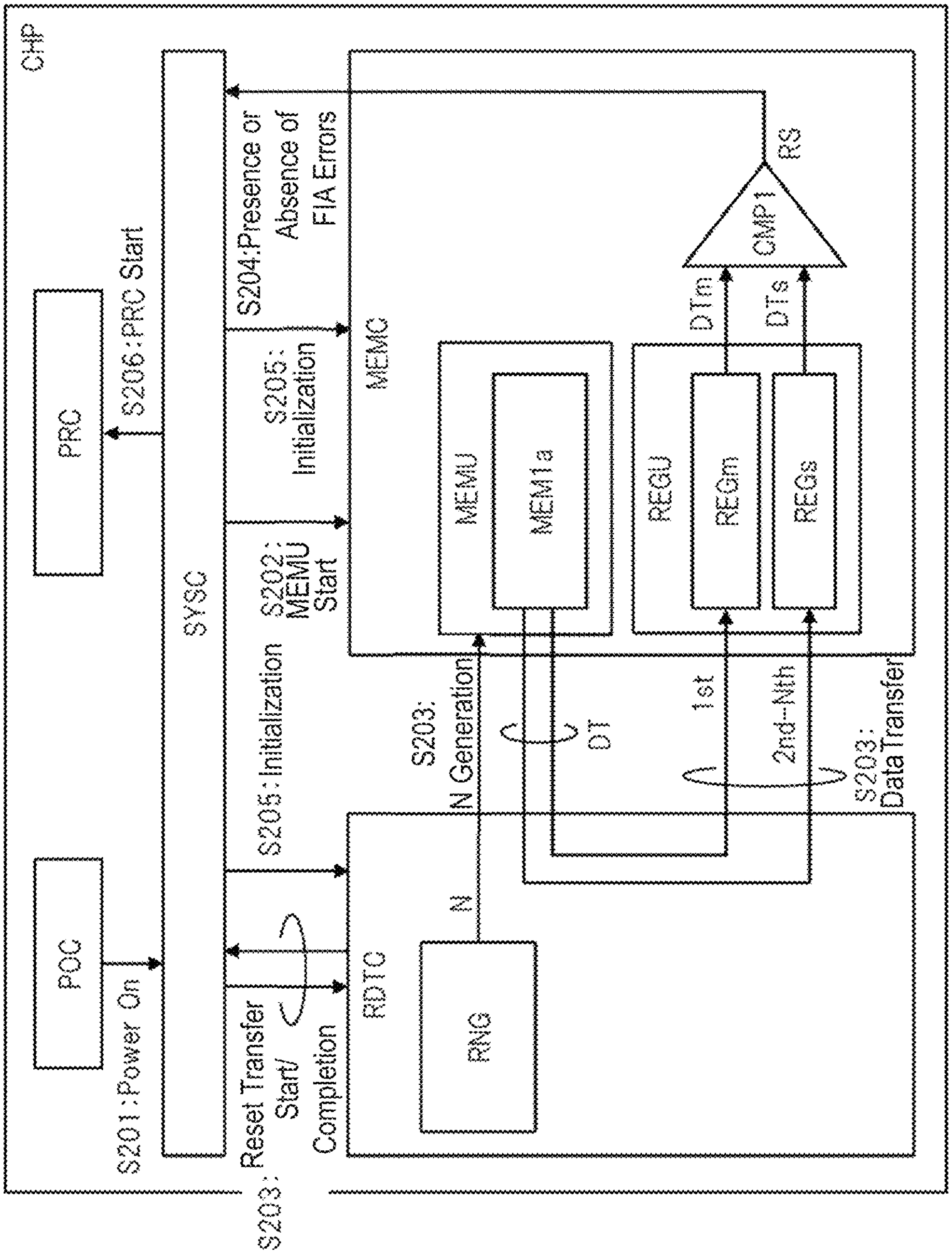
FIG. 3B is a diagram schematically representing the processing content shown in FIG. 3A and shows an example of a signal transmission path inside the semiconductor device.

FIG. 3A is a flowchart showing an example of detailed processing contents at the time of chip startup in the semiconductor device shown in FIG. 1. FIG. 3B is a diagram schematically representing the processing contents shown in FIG. 3A and shows an example of a signal transmission path inside the semiconductor device. FIG. 3B shows some examples of configurations extracted from the semiconductor chip CHP shown in FIG. 1.

In FIGS. 3A and 3B, the power-on controller POC, for example, releases the reset state of the semiconductor chip CHP in response to power supply to the semiconductor chip CHP or a reset signal from an external reset terminal (step S201). The system controller SYSC starts the memory unit MEMU in response to the release of the reset state (step S202). Specifically, the system controller SYSC supplies power to the first memory MEM1$a$, etc., and makes the first memory MEM1$a$ accessible. The processes of steps S201 and S202 correspond to the power-on process (step S101).

Subsequently, the reset data transfer controller RDTC executes N times data transfer, that is, N times reset transfer (step S203). Specifically, as shown in FIG. 3B, the reset data transfer controller RDTC transfers the data DT stored in the first memory MEM1$a$, specifically the initial setting data, to the main register REGm at the time of the first data transfer. On the other hand, from the second to the Nth data transfer, the reset data transfer controller RDTC transfers the data DT stored in the first memory MEM1$a$, that is, the same initial setting data as the first time, to the sub-register REGs. In other words, if the value of N is an integer greater than or equal to 3, the reset data transfer controller RDTC sequentially overwrites the data DT stored in the first memory MEM1$a$ to the sub-register REGs from the second to the Nth data transfer. The process of step S203 corresponds to the reset transfer process (step S102).

Next, the system controller SYSC executes the FIA error check (step S204). Specifically, as shown in FIG. 3B, first, the comparison circuit CMP1 determines the match/mismatch between the data DTm transferred to the main register REGm and the data DTs transferred to the sub-register REGs. Thus, the comparison circuit CMP1 verifies the validity of the data DTm transferred to the main register REGm for the first time using the data DTs transferred to the sub-register REGs for the Nth time.

Then, the comparison circuit CMP1 outputs a determination result signal RS, which represents the result of the determination, to the system controller SYSC. In the event that the determination result signal RS indicates a mismatch (step S204: error present), the system controller SYSC initializes the reset transfer (step S205). Specifically, the system controller SYSC clears the values of each register contained in the memory controller MEMC and the reset data transfer controller RDTC, including the register unit REGU. Thereafter, the system controller SYSC returns to step S203 and causes the reset data transfer controller RDTC to execute the data transfer N times again.

On the other hand, if the determination result signal RS from the comparison circuit CMP1 indicates a match (step S204: no error), the system controller SYSC starts the processor PRC by releasing its reset state, among other actions (step S206). Furthermore, after executing the data transfer N times again via the reset data transfer controller RDTC following step S205, the system controller SYSC also starts the processor PRC if the determination result signal RS indicates a match. The processes of steps S204 and S205 correspond to the processor start determination process (step S103), and the process of step S206 corresponds to the processor start process (step S104).

Thus, the semiconductor chip CHP determines the presence of an FIA error by verifying the validity of the data DTm transferred first using the data DTs transferred for the Nth time during the reset transfer. If no FIA error is detected, the semiconductor chip CHP starts the processor PRC; if an FIA error is detected, it does not start the processor PRC. By not starting the processor PRC, the semiconductor device cannot be controlled illicitly, protecting the semiconductor device from glitch attacks (FIA).

On the other hand, using such a method, the conditions under which an FIA error detection might be missed are: (A) if attacks are carried out both during the first data transfer and the Nth data transfer, and (B) if the data alteration caused by the attacks is identical. The probability of both conditions (A) and (B) being met simultaneously is generally considered low. Especially, by sequentially changing the timing targeted for attacks using the random number N, the probability of meeting both conditions (A) and (B) simultaneously becomes significantly lower. As a result, if the initial setting data is destroyed by a glitch attack (FIA) during the reset transfer, it can be detected with a high probability.

It is also possible to sequentially verify the validity of the data DTm transferred for the first time using each of the data transferred from the second to the Nth time. In this case, it is substantially possible to verify whether a glitch attack has been carried out during the period of reset transfer. However, in such a method, FIA errors may be excessively detected. That is, even if a glitch attack has been carried out, there is no particular problem if the data DTm transferred for the first time is valid data. From this perspective, a method of verifying the validity of the data DTm transferred for the first time using the data DTs transferred for the Nth time, as shown in FIGS. 3A and 3B, is desirable.

Furthermore, here, in the sub-register REGs, the data DT from the first memory MEM1$a$ is sequentially overwritten during the data transfer from the second to the Nth time. As a result, for example, compared to the case where a plurality of sub-registers corresponding to the data transfer from the second to the Nth time are provided, the area of the register can be reduced. In a glitch attack, not only the data in the destination register but also the data stored in the source memory can be attacked. In the configuration example shown in FIG. 1, since the first memory MEM1*a*, which is the source, is a non-rewritable memory, the data in the source memory is not destroyed.

Figure 4:
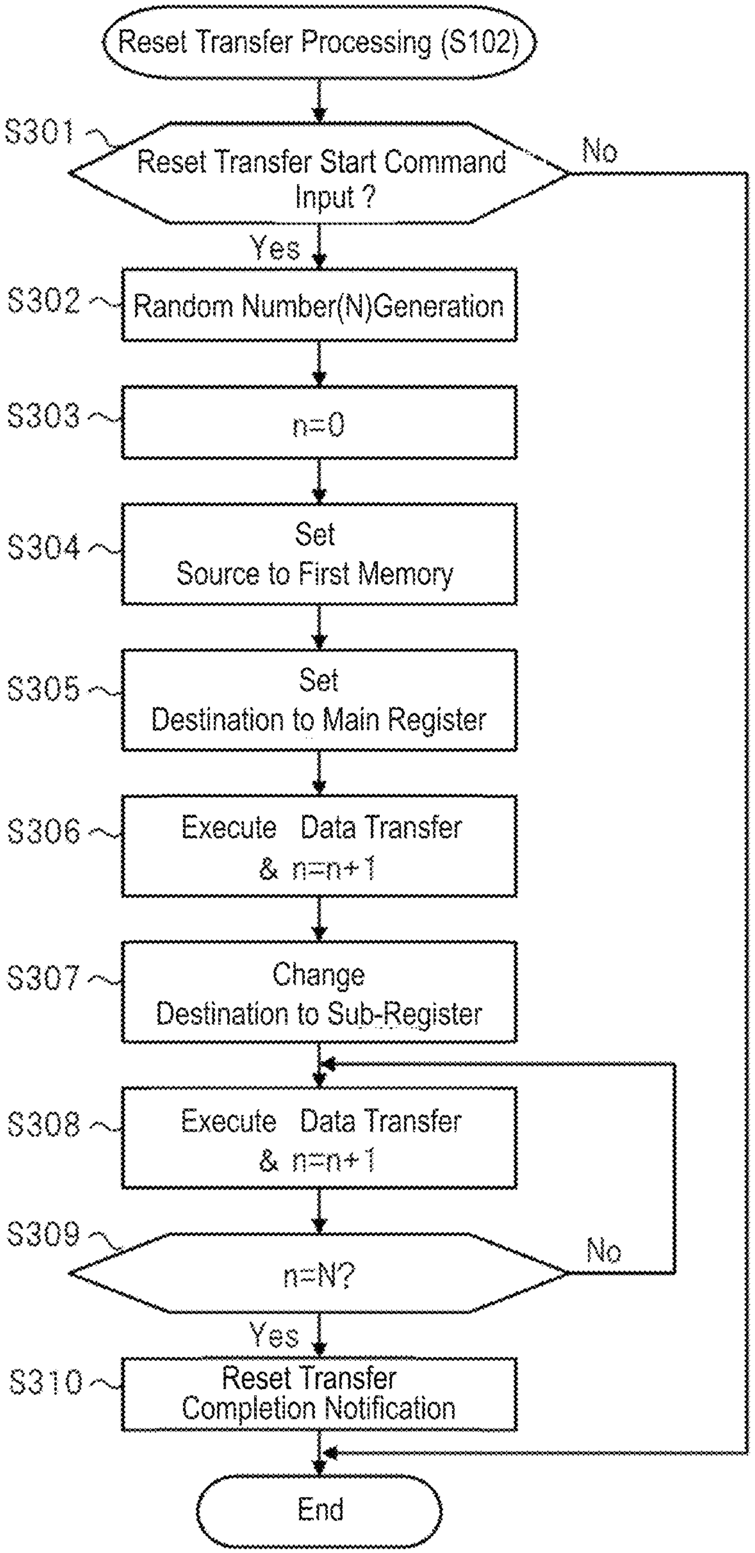
FIG. 4 is a flowchart showing an example of detailed processing content in the reset transfer processing shown in FIGS. 2 and 3A.

FIG. 4 is a flowchart showing an example of the detailed processing content in the reset transfer processing (step S102) shown in FIGS. 2 and 3A. The reset data transfer controller RDTC includes, for example, a sequencer circuit that executes processing as shown in FIG. 4. In FIG. 4, the reset data transfer controller RDTC waits for a reset transfer start command from the system controller SYSC (step S301).

When the reset data transfer controller RDTC receives the reset transfer start command (step S301: Yes), it generates a random number as the value of N using a random number generation circuit RNG (step S302). The reset data transfer controller RDTC also initializes the transfer count n to zero (step S303).

Subsequently, the reset data transfer controller RDTC sets the source to the first memory MEM1*a*, specifically, to the address where the initial setting data is stored in the first memory MEM1*a* (step S304). The reset data transfer controller RDTC also sets the destination to the main register REGm, specifically, for example, to the address assigned to the main register REGm (step S305).

Using such settings, the Reset Data Transfer Controller RDTC executes data transfer and updates the transfer count n (step S306). Specifically, the Reset Data Transfer Controller RDTC performs read access to the first memory MEM1*a* at the source and writes the read data into the main register REGm at the destination by enabling it.

Subsequently, the Reset Data Transfer Controller RDTC changes the destination to the sub-register REGs, specifically, for example, to the address assigned to the sub-register REGs (step S307). Using the changed settings, the Reset Data Transfer Controller RDTC executes data transfer and updates the transfer count n (step S308). Then, the Reset Data Transfer Controller RDTC repeats the process of step S308 until the transfer count n reaches N (step S309: No).

On the other hand, when the transfer count n reaches N (step S309: Yes), the Reset Data Transfer Controller RDTC outputs a reset transfer completion notification to the System Controller SYSC (step S310). Note that the information on the source and destination in steps S304, S305, S307 is, for example, fixedly determined on the circuit in advance.

<Main Effects of the First Embodiment>

As described above, in the method of the first embodiment, the presence or absence of FIA errors in the data stored in the main register REGm is detected using the main register REGm, the sub-register REGs, and the comparison circuit CMP1. If there is no FIA error, the processor PRC is activated. As a result, typically, the semiconductor device can be protected from glitch attacks (FIA).

Second Embodiment

<Underlying Problem>

In the method of the first embodiment described above, to prevent data destruction in the memory at the source, the memory at the source, namely the first memory MEM1*a*, is composed of an OTP-ROM or the like that cannot be rewritten. On the other hand, if the memory at the source is composed of a rewritable non-volatile memory, the identity of the data transferred to the register is maintained even if the data in the memory itself is destroyed, so an FIA error will not be detected. Therefore, some measures are required in case data destruction occurs in the memory at the source.

<Schematic Configuration of the Semiconductor Device>

Figure 5:
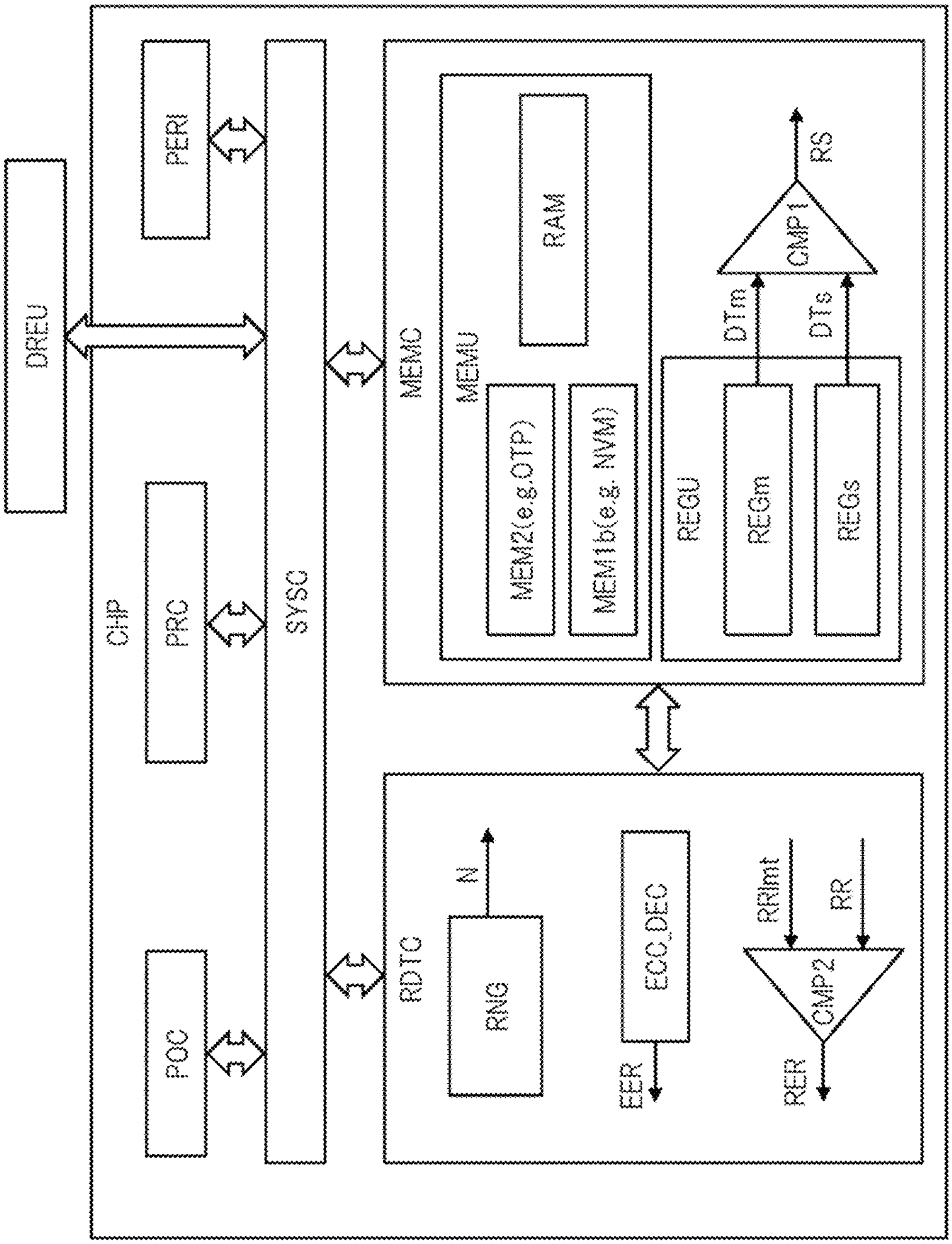
FIG. 5 is a block diagram showing a schematic configuration example of main parts of a semiconductor device according to a second embodiment.
Figure 6:
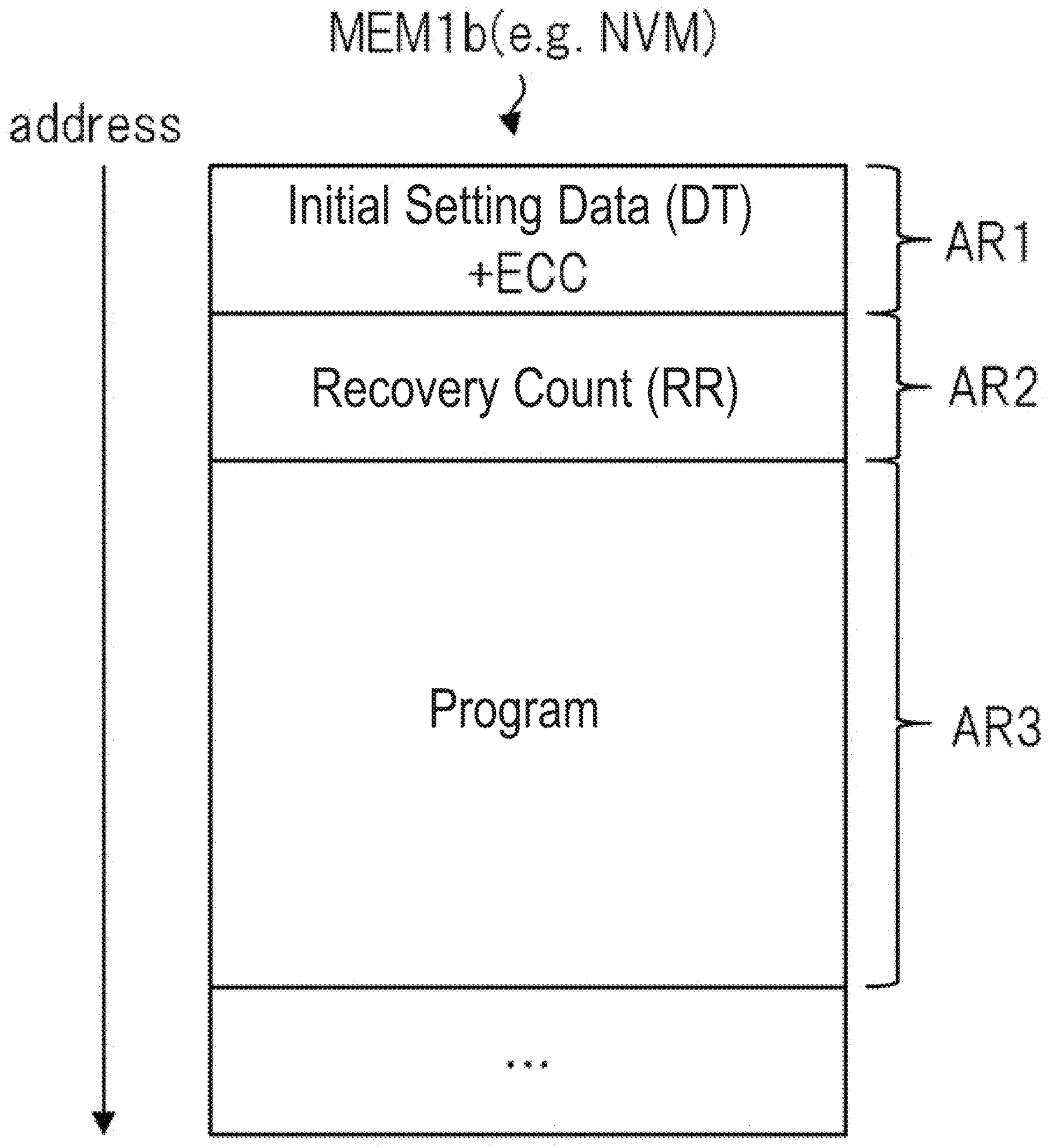
FIG. 6 is a schematic diagram showing an example of information stored in a first memory in FIG. 5.

FIG. 5 is a block diagram showing an example of the main configuration of the semiconductor device according to the second embodiment. FIG. 6 is a schematic diagram showing an example of the information stored in the first memory (MEM1*b*) in FIG. 5. The semiconductor chip CHP shown in FIG. 5 differs from the configuration example shown in FIG. 1 in the following points.

As a first point of difference, a memory unit MEMU comprises a first memory MEM1*b*, a second memory MEM2, and a volatile memory RAM. The first memory MEM1*b*, unlike in the case of FIG. 1, is composed of a rewritable non-volatile memory NVM such as, for example, flash memory, MRAM, etc. The second memory MEM2 is composed of a non-volatile memory that allows only a single write, in other words, a non-rewritable non-volatile memory, such as, for example, fuse ROM, OTP-ROM, etc.

As shown in FIG. 6, the first memory MEM1*b* stores in address area AR1, data DT, more specifically, initial setting data, and an error correction code ECC added to the data DT. The error correction code ECC is uniquely determined by performing a predetermined operation on the data DT. Furthermore, the first memory MEM1*b* stores a recovery count RR, which will be described later, in address area AR2, and stores a program in address area AR3. The program is copied to a volatile memory RAM such as SRAM, similar to the case of FIG. 1, and executed by a processor PRC.

As a second point of difference, a reset data transfer controller RDTC further comprises an ECC (Error Check and Correction) decoder ECC_DEC and a comparison circuit (second comparison circuit) CMP2. The reset data transfer controller RDTC executes data transfer from the memory unit MEMU to the register unit REGU via the ECC decoder ECC_DEC during reset transfer.

At this time, the ECC decoder ECC_DEC determines whether error correction is possible based on the error correction code ECC added to the data DT, namely the initial setting data. If error correction is possible, for example, in the case of a 1-bit error, the ECC decoder ECC_DEC transfers the data DT after error correction to the register unit REGU. On the other hand, if error correction is not possible, for example, in the case of a 2-bit error, the ECC decoder ECC_DEC outputs an ECC error signal EER to the system controller SYSC.

The comparison circuit CMP2 determines whether the recovery count RR stored in the first memory MEM1*b* has reached a preset recovery count upper limit value RRlmt. The recovery count upper limit value RRlmt is stored in the second memory MEM2 here. If the recovery count RR reaches the upper limit value RRlmt, the comparison circuit CMP2 outputs a recovery error signal RER to the system controller SYSC. Although details will be described later, the system controller SYSC controls so that at least the processor PRC is not activated when the ECC error signal EER or the recovery error signal RER is input.

As a third point of difference, a data recovery unit DREU is provided outside of the semiconductor chip CHP. In detail, the data recovery unit DREU is, for example, provided in a higher-level device that manages the semiconductor chip CHP within a predetermined system including the semiconductor chip CHP. The data recovery unit DREU retains backup data of data DT. Then, the data recovery unit DREU transmits the backup data to the system controller SYSC in response to a data recovery request from the semiconductor chip CHP, specifically from the system controller SYSC. Thus, the system controller SYSC can correctly restore the data DT even if it becomes impossible to correct errors.

<Detailed Operation of the Semiconductor Device>

Figure 7A:
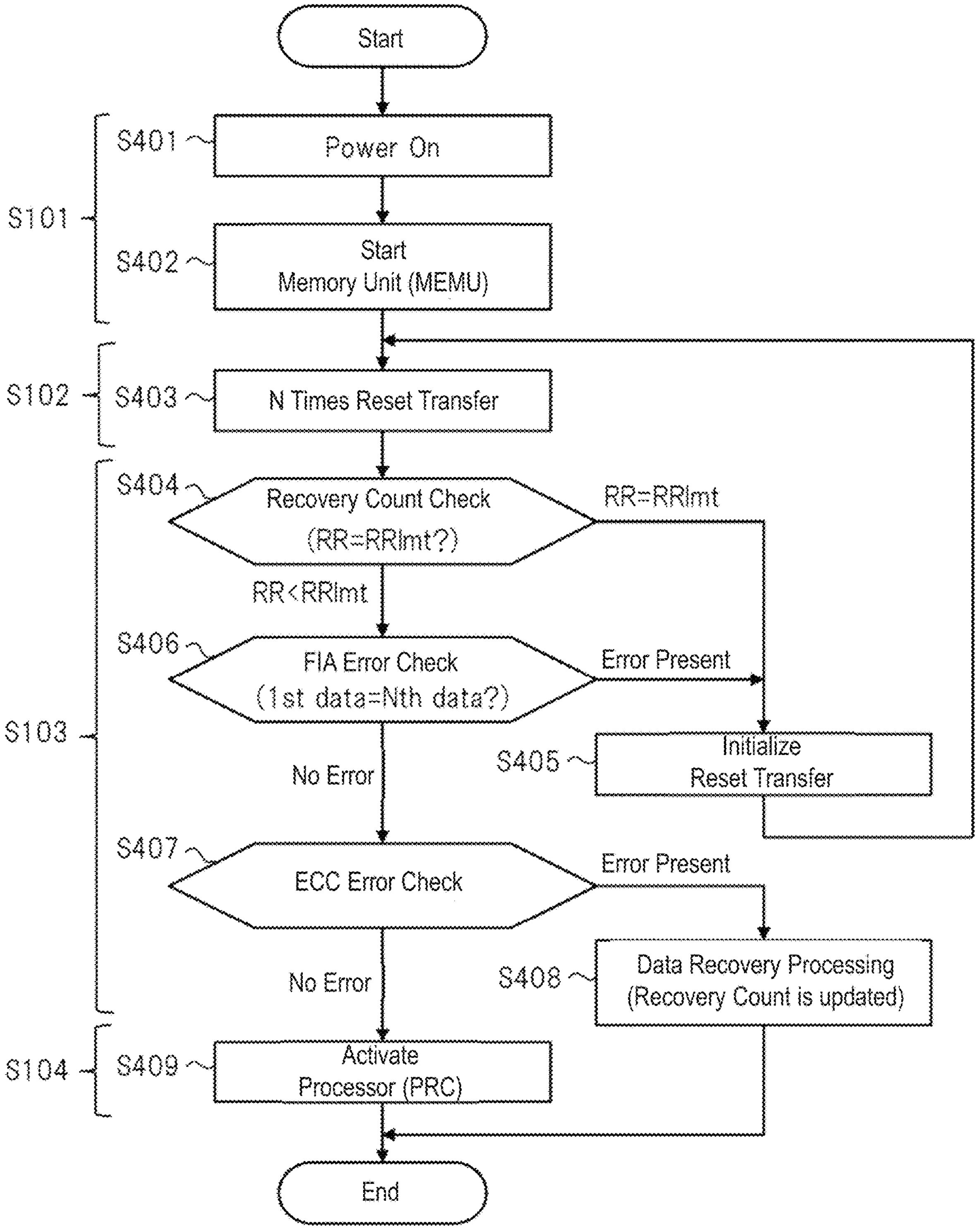
FIG. 7A is a flowchart showing an example of detailed processing content at chip startup in the semiconductor device shown in FIG. 5.
Figure 7B:
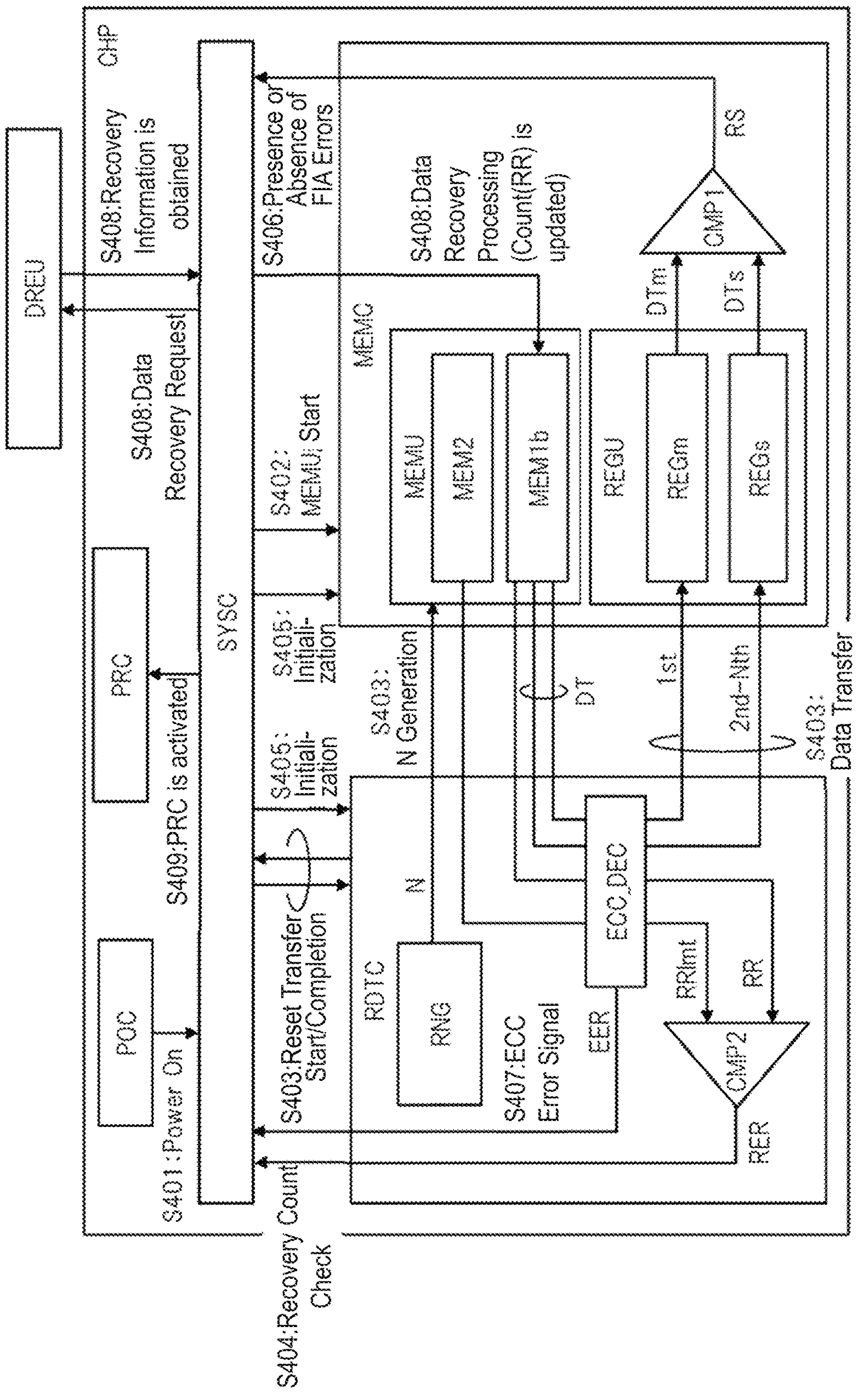
FIG. 7B is a diagram schematically representing the processing content shown in FIG. 7A and shows an example of a signal transmission path inside the semiconductor device.

FIG. 7A is a flowchart showing an example of detailed processing content at the time of chip startup in the semiconductor device shown in FIG. 5. FIG. 7B is a diagram schematically representing the processing content shown in FIG. 7A and shows an example of a signal transmission path inside the semiconductor device. FIG. 7B shows some configuration examples extracted from the semiconductor chip CHP shown in FIG. 5.

In FIGS. 7A and 7B, the processing from step S401 to step S403 is the same as the processing from step S201 to step S203 shown in FIGS. 3A and 3B. Briefly, the power-on controller POC releases the reset state of the semiconductor chip CHP (step S401). In response, the system controller SYSC starts the first memory MEM1*b* and the second memory MEM2, among others (step S402). Subsequently, the reset data transfer controller RDTC performs N times data transfer, that is, N times reset transfer (step S403). Specifically, as shown in FIG. 7B, the reset data transfer controller RDTC transfers the data DT stored in the first memory MEM1*b* to the main register REGm via the ECC decoder ECC_DEC during the first data transfer.

At this time, the ECC decoder ECC_DEC determines the presence of errors and, if there are errors, whether error correction is possible based on the error correction code ECC added to the data DT. Then, if there are errors that can be corrected, the ECC decoder ECC_DEC transfers the data DT after error correction to the main register REGm. On the other hand, if there are errors that cannot be corrected, the ECC decoder ECC_DEC outputs an ECC error signal EER to the system controller SYSC.

On the other hand, from the second to the Nth data transfer, the reset data transfer controller RDTC transfers the data DT stored in the first memory MEM1*b*, that is, the same initial setting data as the first time, to the sub-register REGs via the ECC decoder ECC_DEC. The processing content of the ECC decoder ECC_DEC at this time is the same as that during the first data transfer. Also, the data DT transferred is sequentially overwritten in the sub-register REGs, as in the case of FIG. 3B.

Subsequently, the system controller SYSC checks whether the recovery count RR has reached the upper limit RRlmt through a recovery count check (step S404). That is, the system controller SYSC determines whether it has received a recovery error signal RER from the comparison circuit (second comparison circuit) CMP2. If the recovery count RR has reached the upper limit RRlmt (step S404: RR=RRlmt), the system controller SYSC initializes the reset transfer in the same manner as in step S205 of FIG. 3A (step S405) and returns to step S403.

On the other hand, if the recovery count RR has not reached the upper limit RRlmt (step S404: RR<RRlmt), the system controller SYSC performs an FIA error check based on the judgment result signal RS from the comparison circuit (first comparison circuit) CMP1, in the same manner as in step S204 of FIG. 3A (step S406). Here, if there is an FIA error (step S406: error present), the system controller SYSC returns to step S403 after initializing the reset transfer in the same manner as in the case of FIG. 3A (step S405).

On the other hand, if there is no FIA error (step S406: no error), the system controller SYSC performs an ECC error check (step S407). Specifically, the system controller SYSC determines whether it has received an ECC error signal EER from the ECC decoder ECC_DEC during the period of N reset transfers in step S403. Here, if an ECC error signal EER is received (step S407: error present), the system controller SYSC performs data recovery processing, during which the recovery count RR is also updated (step S408).

Specifically, as shown in FIG. 7B, if the system controller SYSC receives an ECC error signal EER, it sends a data recovery request to the data recovery unit DREU to repair the data DT stored in the first memory MEM1*b*. In response, the system controller SYSC obtains recovery information, that is, the correct data that has been backed up, from the data recovery unit DREU. The system controller SYSC updates the data DT and the error correction code ECC in the first memory MEM1*b* with the correct data, and additionally updates the recovery count RR.

On the other hand, in FIG. 7A, when the ECC error signal EER is not input (step S407: no error), the system controller SYSC activates the processor PRC (step S409). That is, the system controller SYSC activates the processor PRC only when the determination result signal RS from the comparison circuit CMP1 indicates a match, without inputting the ECC error signal EER. The processing from step S404 to step S408 corresponds to the processor activation determination processing (step S103). The processing at step S409 corresponds to the processor activation processing (step S104).

Using such a method, even if the data DT in the first memory MEM1*b* is destroyed by a glitch attack (FIA), the processor PRC can be activated under the condition that the destruction is correctable by error correction and no FIA error arises from the comparison circuit CMP1. On the other hand, if uncorrectable destruction occurs in the data DT in the first memory MEM1*b* due to a glitch attack, or if an FIA error arises from the comparison circuit CMP1, the processor PRC will not be activated. This allows the semiconductor device to be appropriately protected from glitch attacks.

For example, an attacker may perform glitch attacks on the first memory MEM1*b* multiple times with varying conditions in search of a desired method of destruction. In this case, if uncorrectable destruction occurs in the data DT in the first memory MEM1*b*, the semiconductor device can be recovered from a failure state by performing data recovery and then restarting the semiconductor device. However, if recovery is allowed indefinitely, the attacker can perform glitch attacks on the first memory MEM1*b* indefinitely with varying conditions, increasing the likelihood of finding the desired method of destruction.

Therefore, here, a maximum number of recoveries RRlmt is set. When the number of recoveries RR reaches the maximum value RRlmt, activation of the processor PRC is thereafter prohibited. On the other hand, for example, if the maximum value RRlmt itself is rewritten to a large value, the maximum value RRlmt is effectively invalidated. Therefore, it is desirable that the maximum value RRlmt is stored in a second memory MEM2 that cannot be rewritten.

Also, in FIG. 7A, if the number of recoveries RR reaches the maximum value RRlmt, an infinite loop occurs in the processing of steps S404, S405, and S403. This ensures that the processor PRC is not activated, at least, thus protecting the semiconductor device. On the other hand, in FIG. 7A, it is assumed that, for example, an error is detected by another error detection function not shown during the occurrence of such an infinite loop, and appropriate measures are taken. However, without using such another error detection function, the system controller SYSC may, for example, notify an external chip of a critical error and terminate the processing if the number of recoveries RR reaches the maximum value RRlmt at step S404.

<Main Effects of the Second Embodiment>

As described above, by using the method of the second embodiment, it is possible to protect the semiconductor device from glitch attacks (FIA) in a manner similar to the first embodiment. Furthermore, even in the case where a rewritable non-volatile memory is applied to the memory of the source, protection can be realized. That is, not only limited to the destination register, but also in the case where a glitch attack is carried out on the memory of the source, appropriate protection can be realized.

Although the invention made by the present inventor has been specifically described based on the embodiment, the present invention is not limited to the embodiment described above, and it is needless to say that various modifications can be made without departing from the gist thereof.

What is claimed is:

1. A semiconductor device comprising:

a semiconductor chip on which a plurality of circuits are formed, wherein the plurality of circuits include a processor, a memory controller comprising a memory unit, a register unit, and a comparison circuit, a reset data transfer controller that executes data transfer from the memory unit to the register unit upon startup of the semiconductor chip, and a system controller that controls the processor, the memory controller, and the reset data transfer controller, wherein the memory unit comprises a first memory storing data necessary for an initial setting of the semiconductor chip, wherein the register unit comprises a first register referred to during the initial setting of the semiconductor chip and a second register for verifying the first register, wherein the reset data transfer controller executes data transfer N times, where N is an integer greater than or equal to 2, the reset data transfer controller transfers the data stored in the first memory to the first register at the first data transfer, and transfers the data stored in the first memory to the second register at the Nth data transfer, wherein the comparison circuit determines the match/mismatch between the data transferred to the first register and the data transferred to the second register and outputs a determination result signal representing the determination result to the system controller, wherein the system controller, if the determination result signal indicates a match, starts the processor, and if the determination result signal indicates a mismatch, does not start the processor and causes the reset data transfer controller to execute the N times data transfer again, wherein the system controller, after causing the reset data transfer controller to execute the N times data transfer again, starts the processor if the determination result signal indicates a match, and wherein the reset data transfer controller comprises a random number generation circuit that generates the value of N as a random number each time the N times data transfer is executed.

2. The semiconductor device according to claim 1, wherein the reset data transfer controller, if the value of N is an integer greater than or equal to 3, sequentially overwrites the data stored in the first memory to the second register from the second to the Nth data transfer.

3. The semiconductor device according to claim 1, wherein the first memory is composed of a non-volatile memory that can be written only once.

4. A semiconductor device comprising:

a semiconductor chip on which a plurality of circuits are formed, wherein the plurality of circuits include a processor, a memory controller comprising a memory unit, a register unit, and a first comparison circuit, a reset data transfer controller comprising an ECC decoder and executing data transfer from the memory unit to the register unit via the ECC decoder upon startup of the semiconductor chip, and a system controller controlling the processor, the memory controller, and the reset data transfer controller, wherein the memory unit comprises a first memory storing data necessary for initial setting of the semiconductor chip and a second memory storing a preset upper limit of a recovery number, wherein the register unit comprises a first register referred to during the initial setting of the semiconductor chip and a second register for verifying the first register, wherein the reset data transfer controller executes data transfer N times, where N is an integer greater than or equal to 2, the reset data transfer controller transfers the data stored in the first memory to the first register via the ECC decoder at the first data transfer, and transfers the data stored in the first memory to the second register via the ECC decoder at the Nth data transfer, wherein the ECC decoder determines whether error correction is possible based on the error correction code added to the data, the ECC decoder transfers the data after error correction if error correction is possible, and outputs an ECC error signal to the system controller if error correction is not possible, wherein the first comparison circuit determines the match/mismatch between the data transferred to the first register and the data transferred to the second register, and outputs a determination result signal representing the determination result to the system controller, wherein the system controller, if the determination result signal represents a mismatch, causes the reset data transfer controller to execute the N times data transfer again, outputs a data recovery request for repairing the data stored in the first memory to the outside of the semiconductor chip upon receiving the ECC error signal, and starts the processor if the determination result signal represents a match without inputting the ECC error signal, wherein the system controller stores the number of recoveries performed in response to the data recovery request in the first memory, wherein the reset data transfer controller further comprises a second comparison circuit determining whether the recovery number stored in the first memory has reached the upper limit stored in the second memory, and outputs a recovery error signal to the system controller if the upper limit is reached, wherein the system controller controls so that at least the processor is not started upon receiving the recovery error signal, and wherein the reset data transfer controller further comprises a random number generation circuit that generates a value of N as a random number each time the N times of data transfer are executed.

5. The semiconductor device according to claim 4, wherein the system controller, after causing the reset data transfer controller to execute the N times data transfer again, starts the processor if the determination result signal represents a match without inputting the ECC error signal.

6. The semiconductor device according to claim 5, wherein the reset data transfer controller, if the value of N is an integer greater than or equal to 3, sequentially overwrites the data stored in the first memory to the second register from the second to Nth data transfer.

7. The semiconductor device according to claim 4, wherein the first memory is composed of a rewritable non-volatile memory.

8. The semiconductor device according to claim 4, wherein the first memory is composed of a rewritable non-volatile memory, and the second memory is composed of a non-volatile memory that can be written only once.

* * * * *